(12) United States Patent
Noguchi

(10) Patent No.: US 10,295,978 B2
(45) Date of Patent: May 21, 2019

(54) ENGINEERING DEVICE, ENGINEERING SYSTEM, AND DOWNLOAD PROCESSING METHOD

(71) Applicant: Azbil Corporation, Tokyo (JP)

(72) Inventor: Takashi Noguchi, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 1015 days.

(21) Appl. No.: 14/735,335

(22) Filed: Jun. 10, 2015

(65) Prior Publication Data

US 2015/0362900 A1 Dec. 17, 2015

(30) Foreign Application Priority Data

Jun. 11, 2014 (JP) ................................ 2014-120228

(51) Int. Cl.
*G05B 19/042* (2006.01)
*G05B 15/02* (2006.01)

(52) U.S. Cl.
CPC .............. *G05B 19/0426* (2013.01); *G05B 2219/23008* (2013.01); *G05B 2219/2609* (2013.01)

(58) Field of Classification Search
CPC ...... G05B 19/0426; G05B 2219/23008; G05B 2219/2609; G05B 19/4184; G06F 11/1417
See application file for complete search history.

(56) References Cited

U.S. PATENT DOCUMENTS

| | | | | |
|---|---|---|---|---|
| 2005/0257215 A1* | 11/2005 | Denby | ...................... | G06F 8/65 717/172 |
| 2007/0074015 A1* | 3/2007 | Shiiba | .................. | G06F 11/1417 713/1 |
| 2007/0226685 A1* | 9/2007 | Kaakani | .................. | G06F 8/656 717/108 |
| 2009/0076628 A1* | 3/2009 | Smith | ................ | G05B 19/4184 700/3 |

FOREIGN PATENT DOCUMENTS

| | | |
|---|---|---|
| JP | 2000-231481 A | 8/2000 |
| JP | 2001-333128 A | 11/2001 |
| JP | 2005-141699 A | 6/2005 |
| JP | 2011-59918 A | 3/2011 |
| KR | 10-0599852 B1 | 7/2006 |

OTHER PUBLICATIONS

Korean Office Action dated Jan. 29, 2016 issued in corresponding Korean Patent Application No. 10-2015-0070453.

* cited by examiner

*Primary Examiner* — Changhyun Yi
(74) *Attorney, Agent, or Firm* — Oblon, McClelland, Maier & Neustadt, L.L.P.

(57) ABSTRACT

An engineering device is provided with a link information storing portion that stores link information indicating a linked control program, from among existing control programs that are running in a controller, which operates in coordination with a new control program, and a restart notifying portion that sends to the controller, as a restart control program that is to be restarted at the same time as the new control program, the linked control program of the new control program, specified by the link information, at the time of a downloading process for the new control program.

5 Claims, 3 Drawing Sheets

FIG. 2

Figure 1:
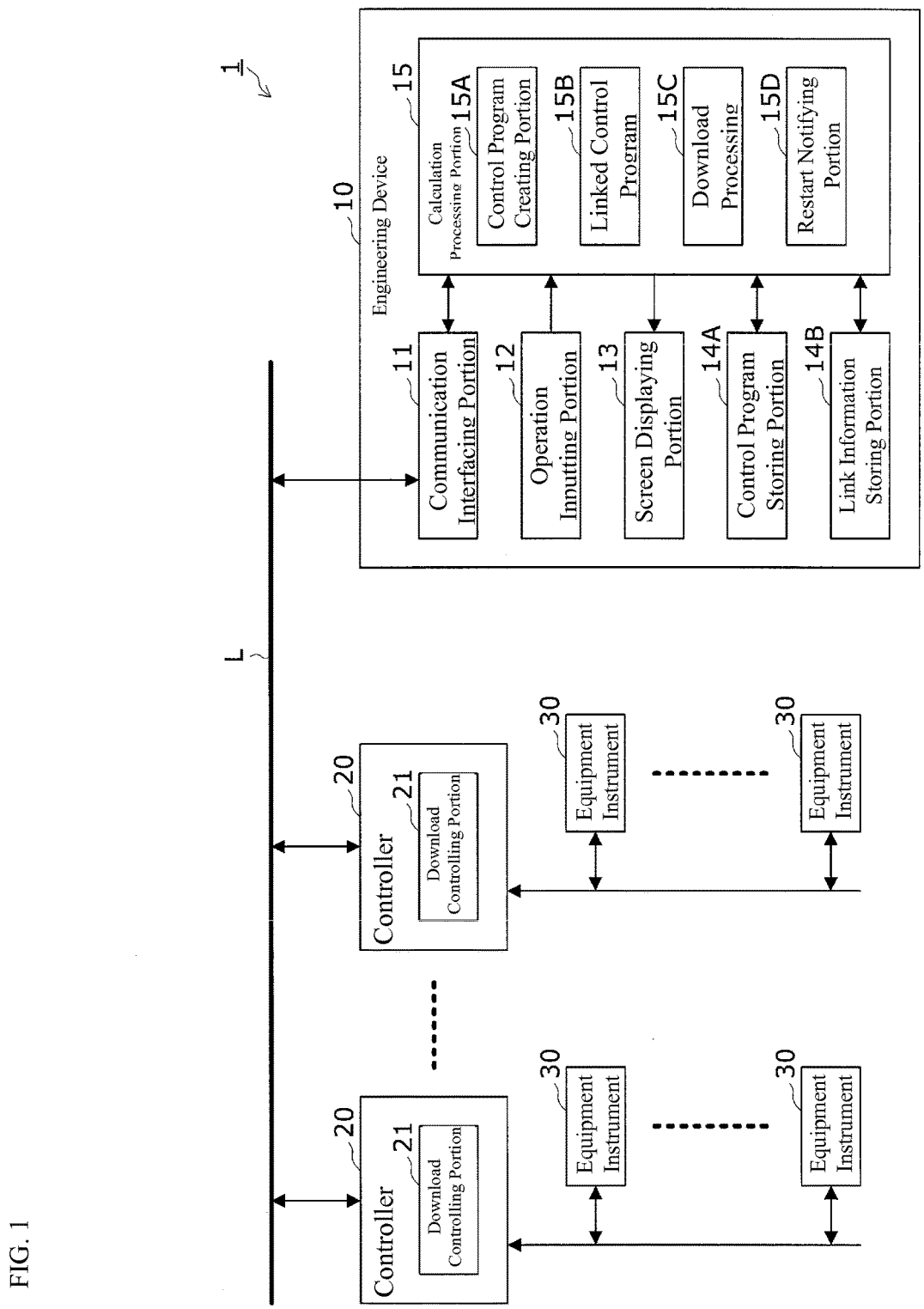

| Control Program | A | B | C | D | E |
|---|---|---|---|---|---|
| A | | Linked | Linked | — | — |
| B | Linked | | — | Linked | — |
| C | Linked | | | — | Linked |
| D | — | Linked | | | — |
| E | — | — | Linked | — | |

ENGINEERING DEVICE, ENGINEERING SYSTEM, AND DOWNLOAD PROCESSING METHOD

CROSS REFERENCE TO RELATED APPLICATION

This application claims priority under 35 U.S.C. § 119 to Japanese Patent Application No. 2014-120228, filed on Jun. 11, 2014, the entire content of which being hereby incorporated herein by reference.

FIELD OF TECHNOLOGY

The present invention relates to an engineering technology used in a facilities controlling system, and, in particular, relates to a download processing technology used when downloading a control program from an engineering device to a controller.

BACKGROUND

When structuring a network system such as for OA (Office Automation) or FA (Factory Automation) wherein a facility such as a building or a plant is controlled by a computer, typically the system is structured by defining in advance locations wherein various types of devices such as air conditioners, elevators, valves, sensors, and the like are disposed, and then, after generating and editing various data for setting up these devices using an engineering device, downloading, to the individual devices, the data that has been set up.

In such engineering devices, when downloading a new control program or setup data to a controller for controlling an equipment instrument, the applicable controller is first switched into an off-line state, which temporarily stops the various control programs that are being executed, after which the new control program and/or setup data is downloaded, and the control program is restarted after the download has been completed.

Conventionally, in order to avoid the control of the equipment instrument from being stopped through stopping the control program when downloading in this way, there have been proposals for technologies for downloading the new control program or setup data in an on-line state with the control program is still running, rather than going into an off-line state wherein the control program that is being executed by the controller is stopped, and then, upon completion of the download, switching from the original control program to the new control program. See, for example, Japanese Unexamined Patent Application Publication No. 2001-333128.

However, this type of conventional technology, merely switches to a new control program or setup data from the original control program in the controller, and operations are continued for the other control programs. Because of this, this may cause, within the controller, a mismatch between the default process data used by the new control program that is restarted and the processing data currently used for those the existing control programs that continue to operate that are linked control programs that are operating in coordination with the new control program, and, and thus there is a problem in that this may cause instability in the state of operation between the linked control programs and the new control program.

The present invention was created in order to solve such an issue, and an aspect thereof is to provide a download processing technology able to preserve a stabilized operating state even when replacing, with new control programs, a portion of the control programs that are running in a controller.

SUMMARY

In order to achieve such an aspect, the present invention provides an engineering device for connecting, through a communication circuit, to a controller for controlling an equipment instrument, and for carrying out a downloading process for a control program used by that controller. The engineering device includes: a download processing portion that carries out a downloading process to the controller for a new control program for replacing a control program that is to be replaced, from among existing control programs that are running in the controller; a link information storing portion that stores link information indicating linked control programs, from among the existing control programs, which operate in coordination with the new control program; and a restart notifying portion that sends, to the controller, as restart control programs that are to be restarted at the same time as the new control program, the linked control programs of the new control program, satisfied by the link information, at the time of a downloading process.

Another structural example of an engineering device according to the present invention further includes: a linked control program detecting portion that detects, and saves in the link information storing portion as the link information, a linked control program that operates in coordination with the new control program, based on details in the descriptions of the new control program and the existing control programs.

Moreover, an engineering system according to the present invention may include a controller that controls an equipment instrument and an engineering device that connects, through a communication circuit, to the controller, and carries out a downloading process for a control program and setup data used by that controller. The engineering device may include: a download processing portion that carries out a downloading process to the controller for a new control program for replacing a control program that is to be replaced, from among existing control programs that are running in the controller; a link information storing portion that stores link information indicating linked control programs, from among the existing control programs, that operate in coordination with the new control program; and a restart notifying portion that sends, to the controller, as restart control programs that are to be restarted at the same time as the new control program, the linked control programs of the new control program, satisfied by the link information, at the time of a downloading process. The controller may include a download controlling portion that downloads the new control program from the engineering device, restarts, to replace an object control program that is running, and, at the time of this starting, starts, at the same time as the new control program, the start control program sent from the engineering device at the time of downloading.

Furthermore, in a download processing method according to the present invention, used by an engineering device for connecting, through a communication circuit, to a controller for controlling an equipment instrument, and for carrying out a downloading process for a control program used by that controller, the download processing method includes: a download processing step wherein a download processing portion carries out a downloading process to the controller for a new control program for replacing a control program that is to be replaced, from among existing control programs that are running in the controller; a link information storing step wherein a link information storing portion stores link information indicating linked control programs, from among the existing control programs, which operate in coordination with the new control program; and a restart notifying step wherein a restart notifying portion sends, to the controller, as restart control programs that are to be restarted at the same time as the new control program, the linked control programs of the new control program, satisfied by the link information, at the time of a downloading process.

Moreover, in another download processing method according to the present invention, used by an engineering system that includes a controller for controlling an equipment instrument and an engineering device for connecting, through a communication circuit, to the controller, and for carrying out a downloading process for a control program and setup data used by that controller, the another download processing method includes: a download processing step performed by the engineering device wherein a download processing portion carries out a downloading process to the controller for a new control program for replacing a control program that is to be replaced, from among existing control programs that are running in the controller; a link information storing step performed by the engineering device wherein a link information storing portion stores link information indicating linked control programs, from among the existing control programs, which operate in coordination with the new control program; and a restart notifying step performed by the engineering device wherein a restart notifying portion sends, to the controller, as restart control programs that are to be restarted at the same time as the new control program, the linked control programs of the new control program, satisfied by the link information, at the time of a downloading process; and a download controlling step performed by the controller wherein a download controlling portion not only downloads the new control program from the engineering device and then restarts, to replace an object control program that is running, but also, at the time of this starting, starts, at the same time as the new control program, the start control program sent from the engineering device at the time of downloading.

Given the present invention, in the controller, not only is the object control program, which is to be replaced, replaced with a new control program and execution thereof commenced, but also the execution of a linked control program is restarted synchronized to the commencement of execution of the new control program.

As a result, the process data in both the new control program and the linked control program use default process data, making it possible to stabilize the operating state of the new control program and of the linked control programs.

BRIEF DESCRIPTIONS OF THE DRAWINGS

Figure 3:
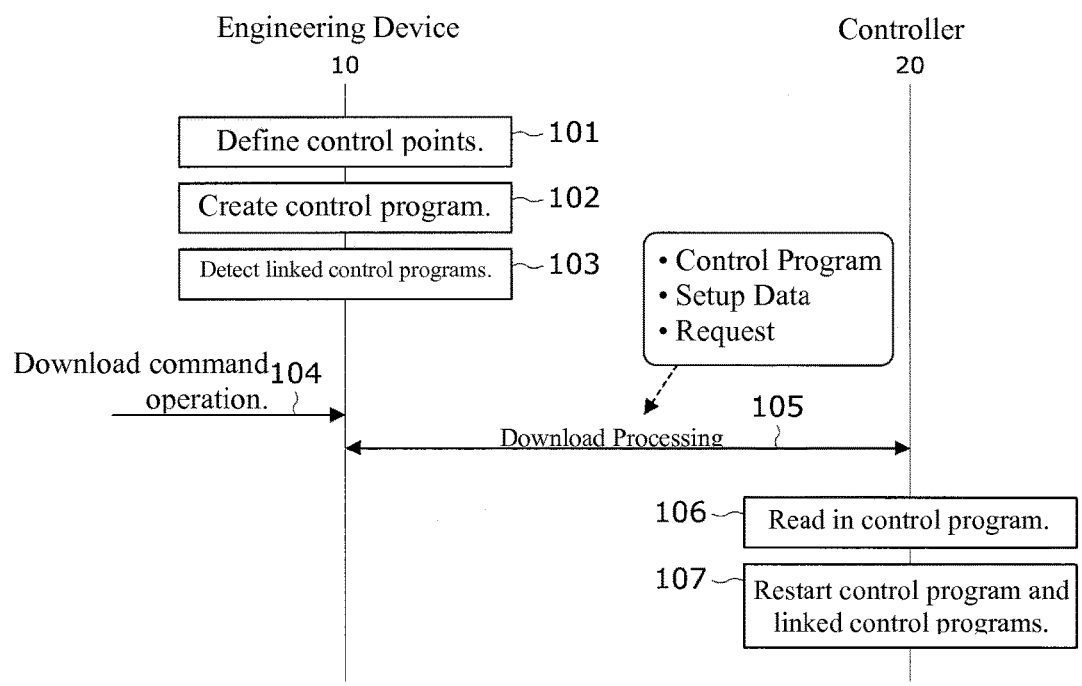

FIG. 1 is a block diagram illustrating a structure of an engineering system.
FIG. 2 is an example configuration of link information.
FIG. 3 is a sequence diagram illustrating the downloading process.

DETAILED DESCRIPTION

A form for carrying out the present disclosure will be explained next in reference to the figures.

Engineering System

First, an engineering system 1 according to an example will be explained in reference to FIG. 1. FIG. 1 is a block diagram illustrating a structure for the engineering system.

This engineering system 1 is structured from: industrial controllers 20 that are used in a network system for office automation, factory automation, or the like, wherein facilities such as buildings, plants, or the like, are controlled by a computer; and an engineering device 10, that is connected through a communication circuit L, to these controllers 20, to carry out a downloading procedure for control programs and setup data used in the controllers 20.

A controller 20 has a download controlling portion 21 for downloading, from the engineering device 10, control programs and setup data, and has a function for controlling an equipment instrument 30, such as a valve, a sensor, or the like, based on the control programs and setup data.

Engineering Device

An engineering device 10 according to the present example will be explained in detail next in reference to FIG. 1.

The engineering device 10, over all, is made from an information communicating terminal, such as a personal computer, and as the primary functional portions thereof, is provided with a communication interface portion 11, an operation inputting portion 12, a screen displaying portion 13, a control program storing portion 14A, a link information storing portion 14B, and a calculation processing portion 15.

The communication interface portion 11 has a function for carrying out data communication with the controllers 20 through a communication circuit.

The operation inputting portion 12 is made from operation inputting devices such as a keyboard, a mouse, and the like, and has a function for detecting an operator operation and outputting it to the calculation processing portion 15.

The screen displaying portion 13 is made from a screen displaying device, such as an LCD, and has functions for displaying various types of screens, such as a control program creating screen and a downloading process screen, depending on instructions from the calculation processing portion 15.

The control program storing portion 14A is made from a storing device, such as a hard disk or a semiconductor memory, and has a function for storing a control program that is used when an equipment instrument 30 is controlled by a controller 20.

The link information storing portion 14B has a function for storing link information that indicates linked control programs that operate in coordination with a new control program that replaces an object control program, from among the existing control programs that are running within the controller 20.

FIG. 2 is an example configuration of link information. Here whether or not there are links between control programs that are run in the controller 20 are registered. For example, in the case of the new control program A, the existing control programs B and C are such linked control programs of A.

The calculation processing portion 15 has a CPU and peripheral circuitry thereof, and has a function for producing a variety of processing portions through reading in and executing programs from a storing portion (not shown).

As the main processing portions achieved through the calculation processing portion 15 there is a control program creating portion 15A, a linked control program detecting portion 15B, a download processing portion 15C, and a restart notifying portion 15D.

The control program creating portion 15A has a function for creating new control programs and setup data in response to operations by operators, detected by the operation inputting portion 12, and a function for saving, to the control program storing portion 14A, the new control programs and setup data that have been created.

The linked control program detecting portion 15B has a function for detecting linked control programs that operate in coordination with a new control program based on the details in the descriptions of the new control program and of existing control programs that are saved in the control program saving portion 14A, and a function for saving, to the link information storing portion 14B, link information indicating the linked control programs that have been detected. At this time, settings inputted by the operator through the operation inputting portion 12 may be saved in the link information storing portion 14B as link information for a linked control program that operates in coordination with a new control program.

The download processing portion 15C has a function for carrying out a process of downloading, to the controller 20, those new control programs that replace the object control programs, from among the existing control programs running in the controller 20.

The restart notifying portion 15D has a function for sending, to the controller 20, as restart control programs that require restarts at the same time as the new control program, linked control programs, of a new program, that have been specified, at the time of a downloading process by the download processing portion 15C, through the link information of the link information storing portion 14B.

Operation of the Present Example

A downloading process according to the present example will be explained next in reference to FIG. 3. FIG. 3 is a sequence diagram illustrating the downloading process.

First the control program creating portion 15A, in response to an operator operation detected by the operation inputting portion 12, carries out data definition, by data type, address, name, unit, or the like, as control points, for monitoring and controlling the state of operation of equipment instrument and the state of operations (Step 101).

Moreover, in response to an operator operation detected by the operation inputting portion 12, the control program creating portion 15A uses these control points that have been defined to carry out calculating processes regarding control of an equipment instrument, to create a control program and save it to the control program storing portion 14A (Step 102).

Following this, the linked control program detecting portion 15B, based on the detail of the description of the new control program and of the existing control programs that are saved in the control program storing portion 14A, detects linked control programs that operate in coordination with the new control program, and to saves, in the link information storing portion 14B, link information indicating the linked control programs that have been detected (Step 103).

Thereafter, in response to a download instruction operation by the operator, detected by the operation inputting portion 12 (Step 104), the download processing portion 15C executes a downloading process for the new control program and the setup data, together with the download controlling portion 21 of the controller 20 (Step 105).

In this downloading process, download command messages, for directing the new control program and setup data that are to be downloaded, download request from the controller 20 in response to the download command messages, and download data comprising the new control program and the setup data, in response to the download requests, are exchanged.

At this time, the restart notifying portion 15D sends to the controller 20, as a restart control program that is to be restarted at the same time as the new control program, a linked control program of the new control program that is specified by the link information in the link information storing portion 14B. Actually, the restart information indicating the restart control program may be sent as a message that is exchanged during the downloading process, or may be sent as a message that is separate from the downloading process.

After the downloading process has been completed, the download controlling portion 21 of the controller 20 reads in and deploys, into the internal working memory, the new control program and the setup data that has been downloaded (Step 106), after which the linked control programs, for which notification has been sent in the restart information from the engineering device 10 at the time of the downloading process, are restarted synchronized with the new control program (Step 107). At this time, the object control program that is to be replaced is stopped.

Effects of the Present Example

In this way, in the present example a link information storing portion 14B stores link information indicating a linked control program that, from among existing control programs that are running in a controller 20, that operates in coordination with a new control program, and a restart notifying portion 15D sends to the controller, as a restart control program that is to be restarted at the same time as the new control program, linked control programs of the new control program, specified by the link information, at the time of a downloading process for the new control program.

Given this, in the controller 20 not only is the object control program, which is to be replaced, replaced with a new control program and execution thereof commenced, but also the execution of a linked control program is restarted synchronized to the commencement of execution of the new control program.

As a result, the process data in both the new control program and the linked control program use default process data, making it possible to stabilize the operating state of the new control program and of the linked control programs.

Moreover, in the present example the linked control program detecting portion 15B may detect linked control programs, which operate in coordination with the new control program, based on the detailed descriptions of the new control program and of the existing control programs, which are stored in the control program storing portion 14A, and link information for indicating the detected linked control programs may be saved in a link information storing portion 14B.

This makes it possible to reduce the operating overhead on the operator by eliminating the need for the operator to set the link information.

EXPANDED EXAMPLES

While the present disclosure was explained above in reference to examples, the present disclosure is not limited by the examples set forth above. The structures and details of the present disclosure may be modified in a variety of ways, as can be understood by those skilled in the art, within the scope of the present disclosure.

The invention claimed is:

1. An engineering device for connecting, through a communication circuit, to a controller that controls an equipment instrument, and for performing a downloading process for a control program used by the controller, the engineering device comprising:
    processing circuitry configured to perform a downloading process to the controller for a new control program to replace a particular control program that is to be replaced, from among existing control programs that are running in the controller; and
    a link information memory that stores link information indicating a linked control program, from among the existing control programs, which operates in coordination with the new control program,
    wherein the processing circuitry is configured to send, to the controller, as a restart control program that is to be restarted at a same time as the new control program, the linked control program of the new control program, indicated by the link information, at a time of performing the downloading process.

2. The engineering device as set forth in claim 1, wherein the processing circuitry is further configured to detect and save, in the link information memory as the link information, the linked control program that operates in coordination with the new control program, based on details in descriptions of the new control program and the existing control programs.

3. An engineering system that includes a controller that controls an equipment instrument and an engineering device that connects, through a communication circuit, to the controller, and performs a downloading process for a control program and setup data used by the controller, wherein:
    the engineering device comprises:
        processing circuitry configured to perform a downloading process to the controller for a new control program to replace a control program that is to be replaced, from among existing control programs that are running in the controller; and
        a link information memory that stores link information indicating linked control programs, from among the existing control programs, which operate in coordination with the new control program,
        wherein the processing circuitry is configured to send, to the controller, as restart control programs that are to be restarted at a same time as the new control program, the linked control programs of the new control program, indicated by the link information, at a time of performing the downloading process; and
    the controller comprises circuitry configured to download the new control program from the engineering device, restart, to replace an object control program that is running, and, at a time of the restarting, start, at a same time as the new control program, the restart control programs sent from the engineering device at the time of performing the downloading process.

4. A download processing method used by an engineering device for connecting, through a communication circuit, to a controller for controlling an equipment instrument, and for performing a downloading process for a control program used by the controller, the method comprising:
    downloading, to the controller, a new control program to replace a particular control program that is to be replaced, from among existing control programs that are running in the controller;
    storing, in a link information memory, link information indicating linked control programs, from among the existing control programs, which operate in coordination with the new control program; and
    sending, to the controller, as restart control programs that are to be restarted at a same time as the new control program, the linked control programs of the new control program, indicated by the link information, at a time of the downloading.

5. A download processing method used by an engineering system that includes a controller for controlling an equipment instrument and an engineering device for connecting, through a communication circuit, to the controller, and for performing a downloading process for a control program and setup data used by the controller, the method comprising:
    downloading, from the engineering device to the controller, a new control program to replace a particular control program that is to be replaced, from among existing control programs that are running in the controller;
    storing, in a memory, link information indicating a linked control program, from among the existing control programs, which operates in coordination with the new control program;
    sending, from the engineering device to the controller, as a restart control program that is to be restarted at a same time as the new control program, the linked control program of the new control program, indicated by the link information, at a time of the downloading by the engineering device; and
    downloading by the controller from the engineering device, the new control program, restarting, to replace an object control program that is running, and, at a time of the restarting, starting, at a same time as the new control program, the restart control program sent from the engineering device.

* * * * *